July 31, 1962 W. H. HIGHLEYMAN 3,047,747

FUNCTION GENERATORS

Filed Aug. 24, 1959

INVENTOR
W. H. HIGHLEYMAN

BY R. B. Ardis

ATTORNEY

United States Patent Office 3,047,747

Patented July 31, 1962

3,047,747
FUNCTION GENERATORS

Wilbur H. Highleyman, Summit, N.J., assignor to Bell Telephone Laboratories, Incorporated, New York, N.Y., a corporation of New York

Filed Aug. 24, 1959, Ser. No. 835,586
12 Claims. (Cl. 307—108)

This invention relates to function generators and more particularly, although in its broader aspects by no means exclusively, to circuits which generate electrical wave forms useful in deflecting an electron beam.

It is often necessary to deflect an electron beam in accordance with a predetermined scanning pattern. One example of such a need is found in devices, sometimes known as character recognition machines, which utilize both optical scanning and logic circuitry to detect the presence of and yield an electrical signal uniquely characteristic of a written character. In such devices an electron beam, deflected according to a predetermined scanning pattern, impinges upon a phosphorescent target area which responsively emits light energy. This light energy, after being focused by a lens system, takes the form of a pencil beam which scans a suitably positioned surface according to the scanning pattern of the electron beam. On this scanned surface are written the characters to be detected. When the pencil beam impinges upon a portion of the written character, a certain quantity of incident light is reflected. When the pencil beam impinges upon a portion of the surface on which a character is written, rather than on a portion of the character itself, a different quantity of incident light is reflected because the surface and the character have different coefficients of reflection. The two levels of reflected light are detected by the light-sensitive surface of a photomultiplier tube which responsively produces an electrical signal consisting of a train of pulses, the spacing and width of which depend upon both the scanned character and the scanning pattern through which the electron beam is deflected. This pulse train together with information characterizing the scanning pattern energize specially designed logic circuitry which yields an electrical indication uniquely characteristic of the scanned character.

In the past electron beams in character recognition machines have generally been deflected in accordance with a raster-type scanning pattern. It has been found, however, that by deflecting the beam in accordance with certain non-raster scanning patterns composed of straight line segments, the logic circuitry necessary to uniquely define a scanned character can be greatly reduced in complexity and number of components. Furthermore, since some of these non-raster, as opposed to raster, scanning patterns are composed of a fewer number of line segments, the time necessary for an electron beam to be deflected through each scan is greatly reduced, thus rendering such a device capable of recognizing characters at a far greater rate than prior art devices. Illustrative examples of non-raster patterns through which a beam may be deflected in order to yield an improved character recognition machine may be found in Figs. 5, 7, 8, and 9, of the article by T. L. Dimond entitled "Devices for Reading Handwritten Characters" published in the December 9–13, 1957, issue of the Proceedings of the Eastern Joint Computer Conference at page 232.

To deflect an electron beam in accordance with a predetermined scanning pattern, appropriate voltage wave forms in the case of electrostatic deflection, or current wave forms in the case of electromagnetic deflection, are generally applied to suitably displaced deflection elements through which the beam passes. Many circuits are known for producing wave forms which, when applied to suitably dispalced deflection elements, deflect an electron beam in accordance with a variety of desirable scanning patterns. Some of these circuits, although adequate for the purpose to which they are applied, lack flexibility in the variety of wave forms which can be generated in response to easily attainable input signals. Other circuits, while capable of generating a great variety of wave forms, are extremely complex. In character recognition machines, while circuit simplicity is of course advantageous, it may be desirable to produce sequentially a variety of scanning patterns. For example, where the position of a written character is unknown, one scanning pattern may be utilized in locating its position, while an entirely different pattern is utilized in scanning the character, after location, for recognition purposes. Or, if the writing contains both letters of the alphabet and numerals, one scanning pattern may be useful in recognizing letters, while a different pattern is useful in recognizing numerals.

Thus, it is one object of this invention to generate with a minimum of circuit complexity a great variety of predetermined electrical wave forms useful in deflecting an electron beam.

It is another object of this invention to generate with a minimum of components a great variety of predetermined electrical signals composed of straight line segments of equal time duration.

It is another object of this invention to generate in response to easily attainable input wave forms a great variety of predetermined electrical wave forms composed of straight line segments.

It is still another object of this invention to generate numerous predetermined electrical signals composed of straight line segments wherein the slopes of adjacent line segments may be of the same or opposite polarities.

It is a further object of this invention to generate a great variety of predetermined electrical wave forms composed of straight line segments wherein the segments, although of equal time duration, are not necessarily of equal magnitude.

It is a still further object of this invention to generate an electrical signal which will linearly sweep to, and remain with no decay for as long a period of time as desired at, a predetermined value.

According to the invention in one of its principal aspects, a first signal level is applied to an integrating circuit to generate an electrical function the amplitude of which changes substantially linearly with time, and a second signal level is substituted for the first a fixed time interval after the first signal level is applied, the elements of the integrating circuit being so related to the first and second signal levels and the fixed time interval that when the second signal level is applied, a signal, equal to the second signal level, is present at one of the elements of the integrating circuit and acts in conjunction with the second signal level to maintain the amplitude of the generated function at the level to which it has changed at the end of the fixed time interval.

In accordance with one feature of the invention a device for presenting sequentially first and second values of impedance to an applied current step is provided for producing sequentially first and second step voltages. In one embodiment of this feature a four-terminal artificial delay network is provided having one pair of terminals shunted by resistance equal to the characteristic impedance of the network, and the other pair of terminals shunted by resistance having a value less than the characteristic impedance. A current step is applied to the terminals shunted by the characteristic impedance, thereby initiating the propagation of an energy wave in the delay network. With the components enumerated above a first equivalent resistance is presented to the applied current step equal to the parallel combination of two resistors, each having the value of the characteristic impedance. This impedance persists until the energy wave, after being reflected from the far terminals of the delay network, reaches the pair of terminals to which the current step was initially applied. At that instant of time the first equivalent resistance presented to the applied current step changes to a second value equal to a parallel combination of the resistances shunting both pairs of terminals. Since the level of the applied current step remains substantially constant, but the impedance presented to that current changes, first and second step voltages are produced. The absolute magnitude of the first step voltage is larger than the absolute magnitude of the second step voltage due to the relative values of the shunting resistances, and the separation in time of the voltage steps equal twice the delay time of the network.

In accordance with another feature of the invention the voltage across an integrating element, a capacitor for example, of an integrating circuit is linearly changed by successively applying the previously referred to first and second step voltages across the integrating circuit. When the first step voltage is applied, the voltage across the capacitor of the integrating circuit begins to change at a relatively linear rate. Due to both the ratio of the first to the second step voltage and their time separation, when the second step voltage replaces the first, the voltage across the capacitor is still changing at a relatively linear rate. This second value of voltage applied across the integrating circuit is, at the instant it is applied, equal to the voltage then appearing across the capacitor of the integrating circuit. Consequently, the voltage across the capacitor sweeps linearly to the second value of voltage, and remains constant at that value for as long a time as the second step voltage is maintained across the integrating circuit. Further, since the voltage sweep across the capacitor occurs between the successive application of the first and second step voltages, and since the time separation of the first and second voltages is constant, the time duration of each voltage sweep, regardless of magnitude, is constant.

In accordance with another feature of the invention the current through an integrating element, an inductor, for example, of an integrating circuit is linearly changed by successively applying the previously referred to first and second step voltages across the integrating circuit. When the first step voltage is applied, the current through the inductor of the integrating circuit begins to change at a relatively linear rate. Due to both the ratio of the first to the second step voltage and their time separation, when the second step voltage replaces the first the current through the inductor is still changing at a relatively linearly rate. This second value of voltage applied across the integrating circuit is, at the instant it is applied, equal to the voltage drop across the remainder of the integrating circuit not including the inductor. Thus, the voltage across the inductor is stepped to zero by the application of the second step voltage across the integrating circuit. Consequently, the current through the inductor sweeps linearly to the value of current flowing through the inductor at the instant the second step voltage is applied, and remains constant at that value for as long a time as the second step voltage is maintained across the integrating circuit. Further, since the current sweep of the inductor occurs between the successive application of the first and second step voltages, and since the time separation of the first and second step voltage is constant, the time duration of each current sweep, regardless of magnitude, is constant.

The foregoing and other objects and features of the invention will be more fully understood by reference to the following description of several embodiments of the invention and the attached drawing in which.

Figure 1:
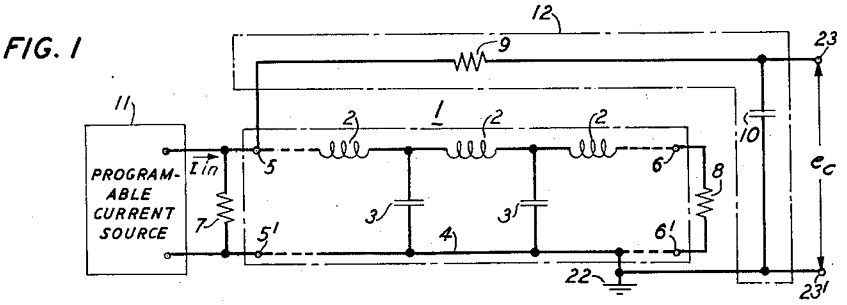
FIG. 1 illustrates an embodiment of the invention useful in generating voltage wave forms.

Illustrated in FIG. 1, mostly in schematic form, is one embodiment of the invention. As therein shown, an artificial delay network 1 having two pairs of terminals 5—5′ and 6—6′ is composed of a ladder-like arrangement of inductors 2, capacitors 3, and a common wire 4. The inductors 2 are serially joined to form an inductive path the ends of which comprise one pair of corresponding terminals 5 and 6 of delay network 1. Each capacitor 3 is situated with one end connected to a junction of two inductors 2, there being one capacitor 3 per junction, while the other end is connected to common wire 4. The ends of common wire comprise the other pair of corresponding terminals 5′ and 6′ of delay network 1. The common wire 4 is connected to a source of reference potential 22, ground for example. The characteristic impedance of delay network 1, hereinafter referred to as $Z_0$, is determined by the relationship $$Z_0=\sqrt{\frac{L}{C}}$$

where L is the inductance of each inductor 2, and the C is the capacitance of each capacitor 3. Delay network 1 requires an interval of time $\delta$ for an electrical impulse to propagate from either pair of terminals, e.g., 5—5′, to the other pair, e.g., 6—6′. It should be understood that a lumped constant type of delay network is described herein for convenience of illustration and not to restrict the invention to this particular type network. As will be apparent to one skilled in the art, the scope of the invention encompasses utilization of any device exhibiting characteristics similar in certain respects to delay network 1.

Connected across terminals 5—5′ and 6—6′, respectively, are a resistor 7 having a resistance $R_7$ equal to $Z_0$, and a resistor 8 having a resistance $R_8$ less than $Z_0$. For purposes of computation, $R_8$ is assumed to include the direct-current resistance of delay network 1.

Also connected across terminals 5—5′ is a programmable current source 11 capable of producing a series of current steps controllable in both magnitude and time separation. Such devices are well known and may consist of, for example, a plurality of resistors connectable across a voltage source so that connection or disconnection of any of the plurality of resistors changes the value of impedance presented to the voltage source, and thus changes the value of current drawn from the source. One example of such a device, to which the invention is by no means restricted, is found in Figs. 5–21 on pages 5–36 of "Notes on Analog-Digital Conversion Techniques" edited by Alfred K. Suskin and published in 1957 by Technology Press of the Massachusetts Institute of Technology. Such devices are easily adaptable to operate in response to a parallel digital input signal.

Attached between terminal 5 and source of reference potential 22 is an integrating circuit 12 comprising serially connected resistor 9 for current regulation purposes, and capacitor 10 for storing electrical charge. As will be apparent to one skilled in the art, other types of integrating circuits, a Miller type integrator for example, may be utilized without deviating from the scope of the invention. As will be fully explained below, in accordance with one important feature of the invention, the time constant, $\tau$, of integrating circuit 12 substantially satisfies the relationship $$\tau=R_9C_{10}=\frac{2\delta}{\ln\left(\frac{R_7+R_8}{R_7-R_8}\right)}$$

where $R_9$ is the resistance of resistor 9, $C_{10}$ is the capacitance of capacitor 10, and ln is the natural logarithmic operator. Regardless of the type integrating circuit employed, the time constant $\tau$ satisfies the above relationship. Connected across capacitor 10 are a pair of output terminals 23—23'.

In operation an input current step, illustrated in FIG. 3*a* as $I_{12}$, is applied to terminals 5—5' by current source 11 at time $T_0$. Initially, the impedance presented to $I_{12}$ consists of a parallel combination of $R_7$, $Z_0$, and the impedance of integration circuit 12. However, the impedance of integration circuit 12 is very high with respect to $R_7$ and $Z_0$, consequently the impedance presented to $I_{12}$ will substantially be a parallel combination of $R_7$ and $Z_0$, which since $Z_0$ and $R_7$ are equal, is equal to $$\frac{Z_0}{2}$$

Thus, the voltage appearing at terminals 5—5' at time $T_0$, illustrated in FIG. 3*b* by $V_{13}$, equals $$\frac{I_{12}Z_0}{2}$$

This first step voltage begins to charge capacitor 10 through resistor 9 in a manner illustrated in FIG. 3*c* as $e_{14}$.

Also at time $T_0$, as a result of the application of input current $I_{12}$, electrical energy begins to propagate in delay network 1 in accordance with the following principles. $R_7$ being equal to $Z_0$, $I_{12}$ divides equally between resistor 7 and delay network 1. The portion of $I_{12}$ which flows into delay network 1 sequentially charges capacitors 3 to a voltage level equal to that appearing across the terminals 5—5', the capacitor 3 closest to terminals 5—5' being charged first. At time $T_0+\delta$, when all capacitors 3 have charged to the voltage appearing across terminals 5—5', the total current flowing into delay network 1 from current source 11 is transmitted through inductors 2 into resistor 8.

Resistor 8, since it has a resistance less than $Z_0$, develops a voltage across itself which is less than that to which capacitors 3 have charged. Capacitors 3, as a consequence of this difference in voltage levels, sequentially partially discharge into resistor 8, the capacitor 3 closest to terminal 6—6' partially discharging first. As capacitors 3 sequentially partially discharge into resistor 8, the voltage levels across each one of capacitors 3 and resistor 8 sequentially equalize at a second level. This sequential discharge of capacitors 3 to a second voltage level appears as a "reflected" energy wave emanating from terminals 6—6' and propagating toward terminal 5—5'. When the capacitor 3 closest terminal 5—5' partially discharges, thereby correspondingly decreasing its voltage, a voltage difference is created between terminal 5 and the junction between inductors 2 closest to terminal 5. This voltage differential results in an increase of current flowing into delay network 1 and, since $I_{12}$ is constant, a corresponding decrease of current flow into resistor 7. Since an energy wave propagating in an artificial delay network will not be reflected from a termination equal to the characteristic impedance of that network, resistor 7, having a resistance $R_7$ equal to $Z_0$, has its current decreased by precisely the amount necessary to correspondingly decrease its voltage to the second voltage level, illustrated in FIG. 3*b* as $V_{15}$. Further, the previously-mentioned increase of current flowing into delay network 1 from current source 11 is precisely the amount necessary to maintain resistor 8 at the second voltage level after capacitors 3 cease their partial discharge. Thus $V_{15}$, the second step voltage level, will remain impressed across terminals 5—5' as long as $I_{12}$ remains applied. Since in the direct-current steady state condition of delay network 1, occurring here at time $T_1$, all inductors 2 present zero impedance to $I_{12}$ $$V_{15} \text{ equals } I_{12}\frac{(R_7R_8)}{R_7+R_8}$$

Inasmuch as a time interval $\delta$ is necessary for an energy wave to propagate from either pair of terminals to the other pair, $T_1$ occurs $2\delta$ time units after $T_0$.

In order for the voltage across capacitor 10 to change at a relatively linear rate to and remain constant at some particular voltage, the voltage across both capacitor 10 and terminals 5—5' must arrive at that particular value of voltage simultaneously. As illustrated in FIG. 2*c*, the voltage across capacitor 10 changes relatively linearly during the $T_0$–$T_1$ time interval, and arrives at $e_{16}$ at time $T_1$. Also at time $T_1$ the voltage across terminals 5—5' is stepped to $V_{15}$. If $V_{15}$ equals $e_{16}$ it is evident that the voltage across, and consequently the current through, resistor 9 becomes zero at $T_1$, thus allowing the voltage across capacitor 10 to remain constant at $e_{16}$. For this to occur the time constant of integrating circuit 12, substantially determined by the values of resistor 9 and capacitor 10, is chosen according to the following principles. During the specific time interval $T_0$–$T_1$, equal to $2\delta$ time units, the voltage across capacitor 10 is relatively linearly changed according to the well-known relationship $$e_c=V\left(i-e^{\frac{-t}{RC}}\right) \quad (1)$$

where $e_c$ is the instantaneous voltage across capacitor 10, V is the voltage applied across the R-C integration circuit, $t$ is the time at which the instantaneous voltage is being determined, C is the capacitance of the capacitor being charged, and R is the resistance through which the capacitor is being charged. Substituting appropriate values in Equation 1, the voltage across capacitor 10 at time $T_1$ is determined;

$$e_{16}=V_{13}\left(1-e^{\frac{-2\delta}{R_9C_{10}}}\right) \quad (2)$$

The impedance of integrating circuit 12 being very high with respect to $R_7$ and $R_8$, the use in Equation 2 of $R_9$ as the resistance through which capacitor 10 charges is a highly accurate approximation. Since $$e_{16}=V_{15}=I_{12}\frac{(R_7R_8)}{R_7+R_8} \quad 3)$$

and $$V_{13}=I_{12}\frac{(R_7)}{2} \quad 4)$$

substituting Equations 3 and 4 in Equation 2 yields, $$\frac{2R_8}{R_7+R_8}=1-e^{\frac{-2\delta}{R_9C_{10}}} \quad (5)$$

Rearrangement of the terms of Equation 5 yields in Equation 6 the time constant of integration circuit 12 which enables the circuit of FIG. 1 to generate a voltage wave form in accordance with the invention.

$$\tau=R_9C_{10}=\frac{2\delta}{\ln\frac{(R_7+R_8)}{R_7-R_8}} \quad (6)$$

Although $e_{14}$, the wave form generated in response to $I_{12}$, has a positive slope, it should be readily apparent, by utilization of the superposition theorem and reasoning analogous to that to the preceding paragraphs, that a voltage wave form with a negative slope is similarly generated in a circuit embodying the invention by application of a negative going step current to terminals 5—5'. For example, if at some arbitrary time $T_2$ the input current from source 11 is stepped to a lower value $I_{17}$, illustrated in FIG. 3*a*, this is equivalent, by superposition, to maintaining $I_{12}$ while a negative current step equal to $I_{12}$—$I_{17}$, is presented to an impedance equal to $$\frac{Z_0}{2}$$

Thus, as in FIG. 3*b*, $V_{15}$ is stepped down to $V_{18}$, equal to $$V_{15}-(I_{12}-I_{17})\frac{(Z_0)}{2}$$

At time $T_3$, equal to $T_2+2\delta$, the voltage across terminals 5—5′ is stepped, by the reflected wave from resistor 8, to $V_{19}$, equal to $$V_{15}-(I_{12}-I_{17})\frac{(R_7R_8)}{R_7+R_8}$$

During the $2\delta$ time unit interval after $T_2$, capacitor 10 is linearly discharging, as illustrated by voltage $e_{20}$ in FIG. 3*c*. If the circuit parameters satisfy the relationship stated in Equation 6, $V_{19}$ equals $e_{21}$ and consequently capacitor 10 remains constant at $e_{21}$ until $I_{17}$ is changed.

Figure 2:
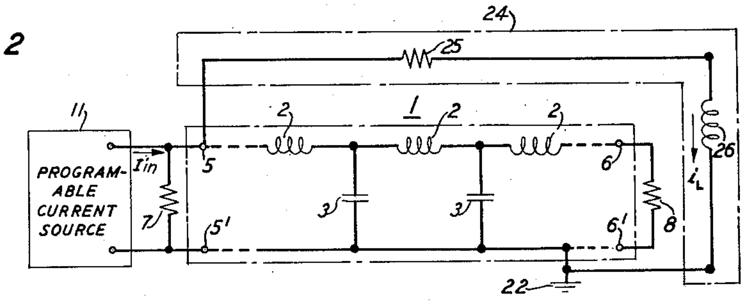
FIG. 2 illustrates another embodiment of the invention useful in generating current wave forms.

Illustrative values of components which may be successfully employed in the embodiment of the invention shown in FIG. 1, but which in no way restrict its scope are:

$R_7=Z_0=1{,}000\Omega$
$R_8=200\Omega$
$R_9=18{,}000\Omega$
$C_{10}=0.028\mu f.$ Illustrated in FIG. 2 is a circuit embodying the principles of the invention which may be utilized if a current wave form is required to be generated having characteristics similar to those of the voltage wave form of FIG. 3*c*. The embodiment of FIG. 2 is similar to that of FIG. 1 except that integrating circuit 24 is substituted for integrating circuit 12 of FIG. 1. Integrating circuit 24 connected between terminal 5 of delay network 1 and potential source 22, comprises serially connected resistor 25 having a resistance $R_{25}$, and inductor 26 having an inductance $L_{26}$. Inductor 26 may, for example, be one of the coils inducing a magnetic field in the deflection yoke of a cathode-ray device. As will be apparent to one skilled in the art, numerous types of circuits having characteristics similar in certain respects to integrating circuit 24 may be utilized to derive an appropriate current wave form without departing from the scope of the invention.

Figure 3:
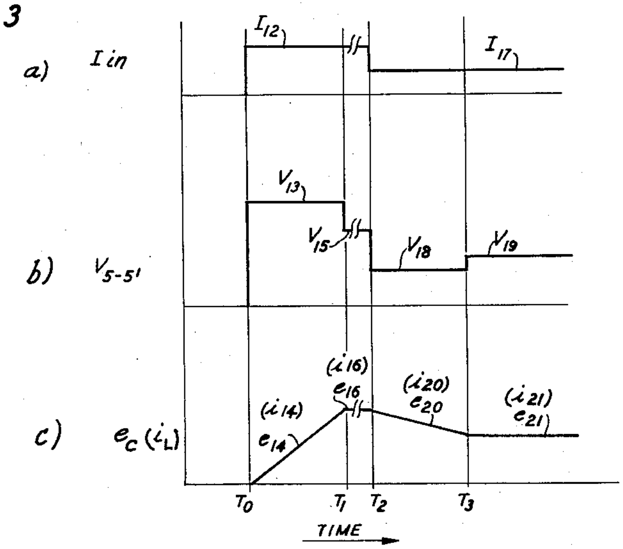
FIGS. 3*a*, 3*b* and 3*c*, illustrate wave forms appearing at various points in the circuits of FIGS. 1 and 2.

In conjunction with an explanation of the operation of the embodiment of the invention illustrated in FIG. 2 reference may again be made to the wave forms of FIG. 3. An input current step, $I_{12}$, is applied at time $T_0$ to terminals 5—5′ of delay network 1. The principles by which delay network 1 in response to $I_{12}$ applies a first and second step voltage, illustrated in FIG. 3*b* as $V_{13}$ and $V_{15}$ respectively, to integration circuit 24 were previously explained in detail and need not be repeated. In response to the application of $V_{13}$ across the integrating circuit 24 the current through inductor 26 begins to change at a relatively linear rate, as illustrated in FIG. 3*c* by $i_{14}$. In order for the current through inductor 26 to change at a relatively linear rate during the $T_0$–$T_1$ time interval, and remain constant after time $T_1$ at some particular value, illustrated by the current wave form in FIG. 3*c*, the voltage across resistor 25, according to the invention, equals $V_{15}$ at time $T_1$. It should be evident that if at time $T_1$, when the voltage across terminals 5—5′ becomes $V_{15}$, the voltage drop across resistor 25 is also equal to $V_{15}$, the voltage across inductor 26 is zero, and thus no further current change is induced through inductor 26 as long as $V_{15}$ remains applied. To determine the parameters of integrating circuit 24 according to the invention, the instantaneous current flowing through circuit 24 is determined by the relationship $$i_L=\frac{V}{R}\left(1-e^{\frac{-Rt}{L}}\right) \qquad (7)$$

where $i_L$ is the instantaneous value of current flowing through the circuit, V is the value of voltage applied to the circuit, R and L are the total resistance and inductance respectively of the circuit, and $t$ is the time for which the instantaneous current is being computed. By substituting appropriate values into Equation 7, the current necessary to develop $V_{15}$ across resistor 24 at time $T_1$ can be found;

$$i_{16}=\frac{V_{15}}{R_{25}}=\frac{V_{13}}{R_{25}}\left(1-e^{\frac{-R_{25}2\delta}{L_{26}}}\right) \qquad (8)$$

Due to the relatively high impedance of resistor 25 with respect to resistors 7 and 8, $R_{25}$ is a highly accurate approximation of the resistance through which inductor 26 draws current. Substituting Equations 3 and 4 into Equation 7, and rearranging terms, substantially yields in Equation 9 the time constant which allows integrating circuit 24 to operate according to the invention.

$$\tau=\frac{L_{26}}{R_{25}}=\frac{2\delta}{\ln\left(\frac{R_7+R_8}{R_7-R_8}\right)} \qquad (9)$$

Although $i_{14}$ is illustrated as a current sweep of positive slope, it should be apparent that a current sweep of negative slope can also be generated by the same circuit. Such a current sweep having a negative slope characteristic is illustrated as $i_{20}$ in FIG. 3*c*, and is generated by application of a negative going current step, such as $I_{17}$ of FIG. 3*a*, to terminals 5—5′ of delay network 1.

While only several illustrative embodiments of the invention have been described herein, it should be apparent to one skilled in the art that numerous other arrangements of components may be devised without departing from the spirit and scope of the invention.

What is claimed is:

1. A function generator comprising an integrating circuit, means for applying a first signal level to said integrating circuit, means including a delay network for applying a second signal level to said integrating circuit a predetermined time interval after said first signal level is applied thereto, and regulating means included in said integrating circuit for providing a signal the level of which changes in a substantially uniform manner to coincide at the termination of said predetermined time interval with said second signal level.

2. A function generator comprising an integrating circuit including an integrating element, means for applying a first step voltage to said integrating circuit, means for applying a second step voltage to said integrating circuit a predetermined time interval after said first step voltage is applied thereto, and means included in said integrating circuit for permitting the voltage across said integrating element to change in a substantially uniform manner to coincide at the termination of said predetermined time interval with the level of said second step voltage.

3. A function generator comprising an integrating circuit including an integrating element, means for applying a first step voltage to said integrating circuit, means including a delay network for applying a second step voltage to said integrating circuit a predetermined time interval after said first step voltage is applied thereto, and current regulating means included in said integrating circuit for permitting the voltage across said integrating element to change in a substantially uniform manner to coincide at the termination of said predetermined time interval with the level of said second step voltage.

4. A signal translating device for generating an electrical signal of one characteristic in response to an electrical signal of a different characteristic comprising an integrating circuit including an integrating element, means for applying a first step voltage to said integrating circuit, means for applying a second step voltage to said integrating circuit a predetermined time interval after said first step voltage is applied thereto, and regulating means included in said integrating circuit for permitting said integrating element to provide a voltage which changes in a substantially linear manner when said second step voltage is applied to a value equal to the difference between said first and said second step voltages.

5. An electric circuit for generating an output voltage in response to an input current comprising an integrating circuit including an integrating element, a first impedance network, means for applying a step current simultaneously to said integrating circuit and said first impedance network, a second impedance network, means for electrically coupling said second impedance network to said first impedance network a predetermined time interval after said step current is applied, and regulating means connected in said integrating circuit for permitting the voltage across said integrating element to change in a substantially linear manner during said predetermined time interval to coincide with the voltage level appearing across said first and second impedance networks at the termination of said predetermined time interval after said step current is applied.

6. An electric circuit for generating an output voltage in response to an input current comprising an integrating circuit including an integrating element; a first resistance element; a second resistance element; a delay network coupling said first and second resistance elements; means for simultaneously applying a current step to said integrating circuit, said first resistance element, and said delay network; and a third resistance element included in said integrating circuit, said third resistance element being of an ohmic value sufficient to permit the voltage across said integrating element to change to the voltage level appearing across said first and second resistance elements at a time interval after said current step is applied to twice the time necessary for an energy wave initiated by said current step to propagate in said delay network from said first to said second resistance elements.

7. A function generator comprising an integrating circuit including a capacitor, means for applying a first step voltage to said integrating circuit, means including an electric delay network for applying a second step voltage to said integrating circuit a predetermined time interval after said first step voltage is applied thereto, and impedance means connected in said integrating circuit for permitting the voltage across said capacitor to change to the level of said second step voltage in said predetermined time interval.

8. An electric circuit for generating a voltage wave form composed of contiguous linear segments comprising a delay network having first and second pairs of terminals between which an electric impulse requires a fixed time interval to propagate, a first resistance element of an ohmic value equal to the characteristic impedance of said delay network connected between said first pair of terminals, a second resistance element the ohmic value of which is less than said characteristic impedance connected between said second pair of terminals, a source of reference potential connected to a corresponding terminal of each pair of terminals, a current path connected between said source of reference potential and the remaining terminal of said first pair of terminals, and serially connected in said path a capacitor and a third resistance element wherein said elements are related substantially by the expression $$R_9C_{10}=\frac{2\delta}{\ln\left(\frac{R_7+R_8}{R_7-R_8}\right)}$$

where $R_7$, $R_8$ and $R_9$ are the ohmic values of said first, second, and third resistance elements respectively, $C_{10}$ is the capacitance value of said capacitor, and $\delta$ is the magnitude of said fixed time interval.

9. A function generator comprising an integrating circuit including an integrating element, a first impedance network, means for applying a step current simultaneously to said integrating circuit and said first impedance network, a second impedance network, means for electrically coupling said second impedance network to said first impedance network a predetermined time interval after said step current is applied, and regulating means included in said integrating circuit for permitting a voltage to be provided in said integrating circuit after said predetermined time interval equal to the voltage level appearing across said first and second impedance networks at said predetermined time interval after said step current is applied.

10. A function generator comprising an integrating circuit including an inductor, means for applying a first step voltage to said integrating circuit, means including an electrical delay network for applying a second step voltage to said integrating circuit a predetermined time interval after said first step voltage is applied thereto, and impedance means connected in said integrating circuit of an ohmic value sufficient to provide a voltage the level of which changes in a substantially uniform manner to coincide at the termination of said predetermined time interval with said second step voltage.

11. An electric circuit for generating a current wave form composed of contiguous linear segments comprising a delay network having first and second pairs of terminals between which an electric impulse requires a fixed time interval to propagate, a first resistance element of an ohmic value equal to the characteristic impedance of said delay network connected between said first pair of terminals, a second resistance element the ohmic value of which is less than said characteristic impedance connected between said second pair of terminals, a source of reference potential connected to corresponding terminals of each pair of terminals, a current path connected between said source of reference potential and the remaining terminal of said first pair of terminals, and serially connected in said path; an inductor and a third resistance element wherein said elements substantially bear the relationship $$\frac{L_{26}}{R_{25}}=\frac{2\delta}{\ln\frac{(R_7+R_8)}{R_7-R_8}}$$

where $R_7$, $R_8$ and $R_{25}$ are the ohmic values of said first, second and third, resistance elements, respectively, $L_{26}$ is the inductance value of said inductor, and $\delta$ is the magniture of said fixed time interval.

12. A function generator comprising an integrating circuit, means for applying a first signal level to said integrating circuit, means for applying a second signal level to said integrating circuit a predetermined time interval after said first signal level is applied thereto, and means included in said integrating circuit for providing a signal the level of which changes in a substantially uniform manner to coincide with said second signal level at the termination of said predetermined time interval.

References Cited in the file of this patent

UNITED STATES PATENTS

| | | |
|---|---|---|
| 2,474,243 | Greenwald | June 28, 1949 |
| 2,617,883 | Anger | Nov. 11, 1952 |
| 2,792,508 | Samsel | May 14, 1957 |